(12) United States Patent
Field

(10) Patent No.: US 7,052,165 B2
(45) Date of Patent: May 30, 2006

(54) VEHICLE HEADLIGHT ASSEMBLY

(76) Inventor: Peter Field, 751 Birch Park Cir. #207, Thousand Oaks, CA (US) 91360

(*) Notice: Subject to any disclaimer, the term of this patent is extended or adjusted under 35 U.S.C. 154(b) by 192 days.

(21) Appl. No.: 10/774,137

(22) Filed: Feb. 9, 2004

(65) Prior Publication Data

US 2005/0174793 A1   Aug. 11, 2005

(51) Int. Cl.
  F21V 19/02   (2006.01)
  F21V 17/02   (2006.01)
  F21V 7/00    (2006.01)
(52) U.S. Cl. ............... 362/524; 362/523; 362/512; 362/514
(58) Field of Classification Search ............ 362/524
  See application file for complete search history.

(56) References Cited

U.S. PATENT DOCUMENTS 1,543,617 A * 6/1925 Piper ..................... 362/529
4,533,984 A * 8/1985 Gatton .................... 362/232
5,971,574 A * 10/1999 Taniuchi et al. ........... 362/508
6,247,835 B1 * 6/2001 Taniuchi .................. 362/524
6,789,929 B1 * 9/2004 Doong et al. ............. 362/538
6,799,876 B1 * 10/2004 Ravier .................... 362/524
6,821,005 B1 * 11/2004 Uchida et al. ............. 362/526

* cited by examiner

*Primary Examiner*—Renee Luebke
*Assistant Examiner*—William J Carter
(74) *Attorney, Agent, or Firm*—Ralph D. Chabot

(57) ABSTRACT

An automotive headlight assembly includes a concave parabolic reflector having a focal axis and a focal point on the axis spaced from the reflector surface. A halogen light source is mounted on an elongated tubular conduit that is oriented on the focal axis of the parabolic reflector. A power mechanism is connected to the tubular conduit for sliding the conduit through a clearance opening aligned with the focal axis, so that the light source is moved between a high beam position on the focal point and a low beam position located at a different point on the focal axis, through an infinite number of in between positions, thus allowing the driver to adjust the focal point of the light to any desired distance.

8 Claims, 2 Drawing Sheets

VEHICLE HEADLIGHT ASSEMBLY

FIELD OF THE INVENTION

This invention relates to a vehicle headlight assembly usable on cars, trucks, motorcycles, and buses.

BACKGROUND OF THE INVENTION

The low beam headlights are used mostly for city night-time driving, where the glare of high beam headlights might tend to blind or irritate the eyes of a driver in an oncoming vehicle. High beam headlights are used most often in country night-time driving, where there are usually no oncoming vehicles. When an oncoming vehicle is encountered, the driver switches to the low beam headlights.

U.S. Pat. No. 6,206,555, issued to K. Redzinsky, et al on Mar. 27, 2001, refers to a mechanism for adjusting a light source relative to a reflector between a low beam position and a high beam position. The patent disclosure does not show the light source or the reflector, so that the functional effect of the adjusting action is unclear.

SUMMARY OF THE INVENTION

The present invention relates to a relatively simple low cost mechanism for adjusting a light source through unlimited positions between the high beam and the low beam, thus producing an infinite number of positions between high and low beams.

In one preferred embodiment of the invention, a concave parabolic reflector has a focal point that defines a location for a light source (bulb) when the head-light assembly is in the high beam operating mode. The light source is mounted on a tubular conduit that is mounted for slidable motion through a central opening in the reflector, whereby the light source can be moved away from the reflector surface to produce an infinite number of lower beam operating positions. An electrical power means (e.g., a motor or solenoid) is connected to the tubular conduit for moving the conduit on its axis to adjust the light source along the focal axis of the reflector.

The reflector can be pivotally supported on the reflector housing so that when the light source moves from high beam position to the low beam position, the reflector light source assembly has downwardly tilted orientation. This feature causes the reflected light rays to be angled predominantly downwardly toward the road surface rather than directly toward the eyes of a driver in an oncoming vehicle.

The electrical power means for adjusting the light source position in the reflector housing can be controlled manually to adjust the angle of the beam position by means of the turn signal lever.

Further features of the invention will be apparent from the attached drawings and description of an illustrative embodiment of the invention.

DESCRIPTION OF A PREFERRED EMBODIMENT OF THE INVENTION

Figure 1:
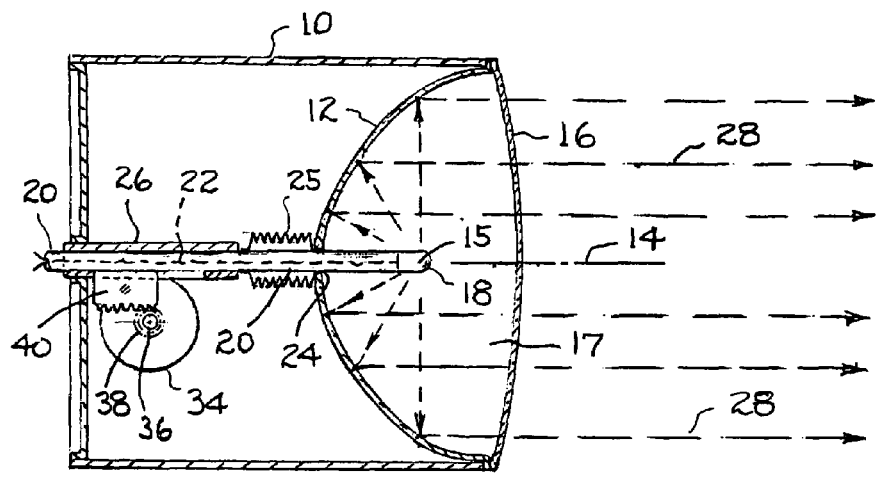
FIG. 1 is a sectional view taken through a vehicle headlight constructed according to the invention. The light source is shown in the high beam position.
Figure 2:
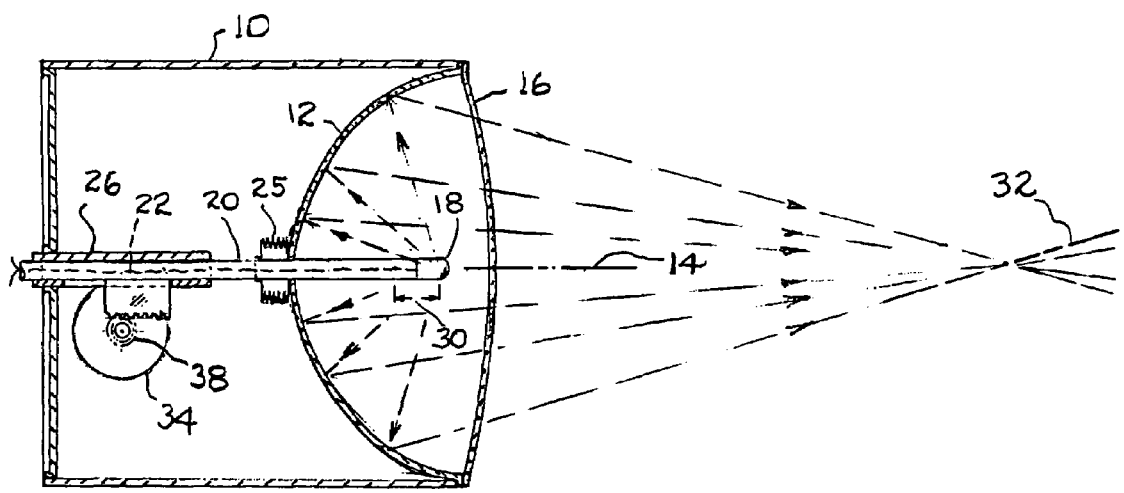
FIG. 2 is a sectional view of the FIG. 1 headlight, with the light source adjusted to the low beam position.

Referring to FIGS. 1 and 2, there is shown a vehicle headlight assembly of the present invention. The assembly comprises a cylindrical housing 10 that mounts a concave parabolic mirror (or reflector) 12 having a central foxal axis 14. The area in front of the reflector is closed by a transparent lens 16, whereby the space 17 within the reflector is sealed against dirt or moisture.

A halogen light bulb (light source) 18 is located on focal axis 14 within sealed space 17, so that light rays are directed toward the parabolic surface of the reflector and then forwardly through transparent lens 16. Light bulb 18 is carried on the forward end of a hollow tubular conduit 20, whose axis is coincident with focal axis 14.

Conduit 20 serves as a mounting mechanism for light source 18, and also as a housing for insulated wiring 22 that supplies electrical current to the light source. Conduit 20 extends through an opening 24 in reflector 12, and through an aligned guide tube 26 in housing 10, whereby tubular conduit 20 can be moved slidably along axis 14 while light source 18 remains centered on axis 14. To prevent the entrance of dirt or moisture into reflector space 17 a bellows type seal 25 is provided for opening 24. One end of the bellows is attached to reflector 12; the other end of the bellows is attached to tube 20.

FIG. 1 shows light source 18 in a position centered on the focal point 15 of the parabolic reflective surface, whereby light rays are reflected off the parabolic surface in generally parallel lines, as indicated by numeral 28 in FIG. 1. The direction taken by the reflected light rays is a function of the parabolic surface contour on reflector 12 and the location of light source 18 at the focal point of the parabolic surface. FIG. 1 represents the high beam operating condition of the head-light assembly, wherein the light beam is relatively concentrated across its cross section.

FIG. 2 shows light source 18 displaced rightwardly away from the parabolic reflective surface from the FIG. 1 position by a distance 30, such that the reflected light rays are divergent from focal axis 14, as indicated by numeral 32 in FIG. 2. FIG. 2 represents the low beam operating condition of the headlight assembly, wherein the emergent light beam is less concentrated across its cross section at the destination point in front of the vehicle.

Tubular conduit 20 can be moved along focal axis 14 to adjust the position of light source 18 between the FIG. 1 high beam position and the FIG. 2 low beam position. Any suitable power means can be used to slide (or move) conduit 20 the necessary distance 30 (FIG. 2). As shown in FIGS. 1 and 2 the power means comprises a servo motor 34 having a drive shaft 36 that carries a pinion gear 38. The pinion gear is mesh with a toothed rack 40 carried by tubular conduit 20. When servo motor 34 is energized in one direction conduit 20 moves rightwardly to position light source 18 in the FIG. 2 low beam position. When servo motor 34 is energized in the opposite direction, conduit 20 moves leftwardly to position light source 18 in the FIG. 1 high beam location. Rack 40 can be connected directly to tube 20 (as shown) or to some other structure attached to tube 20.

Different types of power mechanism can be used to move conduit 20 back and forth on focal axis 14. For example, a linear motor or solenoid or spring assembly could be used. In one such case the solenoid would move conduit 20 to the FIG. 2 low beam position, and a compression spring would move the conduit to the FIG. 1 position (with the solenoid in a de-energized condition).

Alternately a motor-driven nut could be used to move conduit 20 back and forth in one arrangement a rotary nut would be driven by a servo motor so as to operate a screw keyed on conduit 20. As noted above, various types of power mechanisms could be used to move conduit 20 back and forth along focal axis 14.

In practice of the invention the power mechanism can be controlled manually and also automatically in response to the presence of light generated by the headlight of an oncoming vehicle. Automatic control can involve the use of a photoconductive light detector on the subject vehicle so that when light rays from an oncoming vehicle are detected the photoconductive cell (detector) triggers a motor control circuit to energize the power means in a direction whereby the light source 18 is adjusted to the FIG. 2 low beam position. Control systems can be designed to modulate the current supplied to the power source, whereby the light bulb can be set in an infinite range of positions between the high beam and low beam positions.

It should be noted that the drawings only show the extreme positions taken by light source 18 (high beam and low beam). Servo motor 34 can be controlled to adjust light source 18 in various intermediate positions (between the high beam position and low beam position). For example, when the servo motor is controlled reflector 12 by means of a bracket 27. Conduit 20 is movable back and forth on axis 14 by means of a servo motor 34 having a drive shaft that carries a pinion gear 38. Gear 38 is in mesh with a toothed rack 40 carried by tubular conduit 20.

Figure 3:
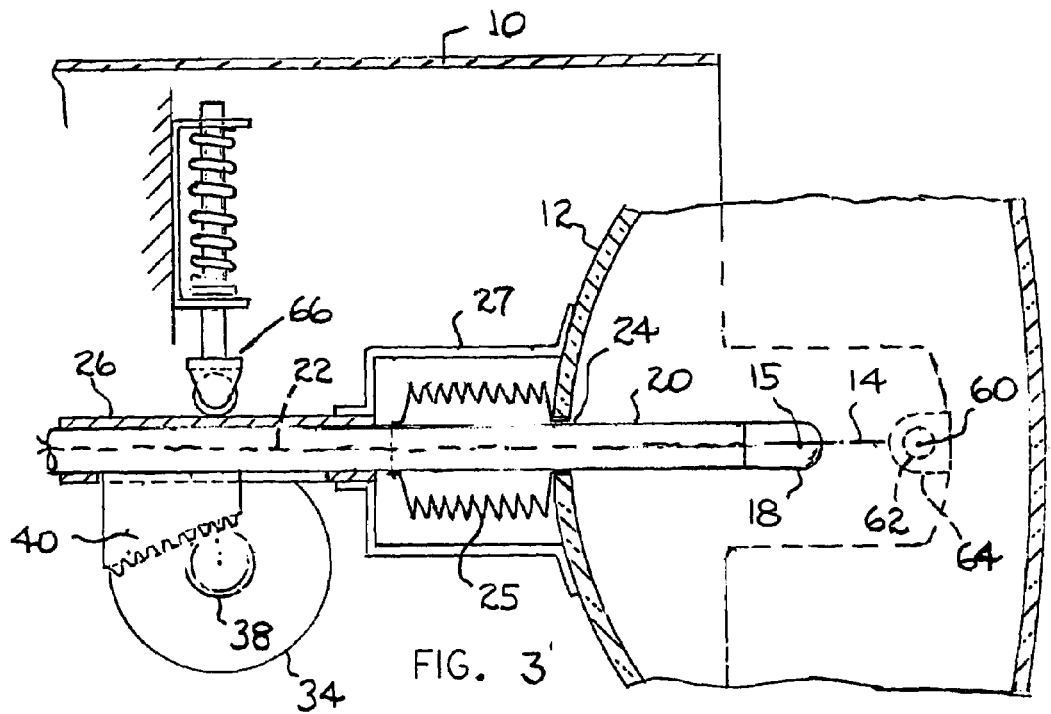
FIG. 3 is a fragmentary sectional view taken through another vehicle headlight assembly of the invention, showing the light source in the high beam position.

Reflector 12 in the FIG. 3 assembly is supported for pivotal movement around a pivot axis 60 defined by two transversely extending pivot pins 62 (one shown in the drawing). Two brackets or pads 64 are affixed to the outer (rear) surface of reflector 12 for locating the two aligned pivot pins 62 in intersecting relation with the reflector focal axis 14. Each pivot pin extends into a pivot hole (or bearing) in housing 10, such that reflector 12 can pivot around transverse axis 60.

Figure 4:
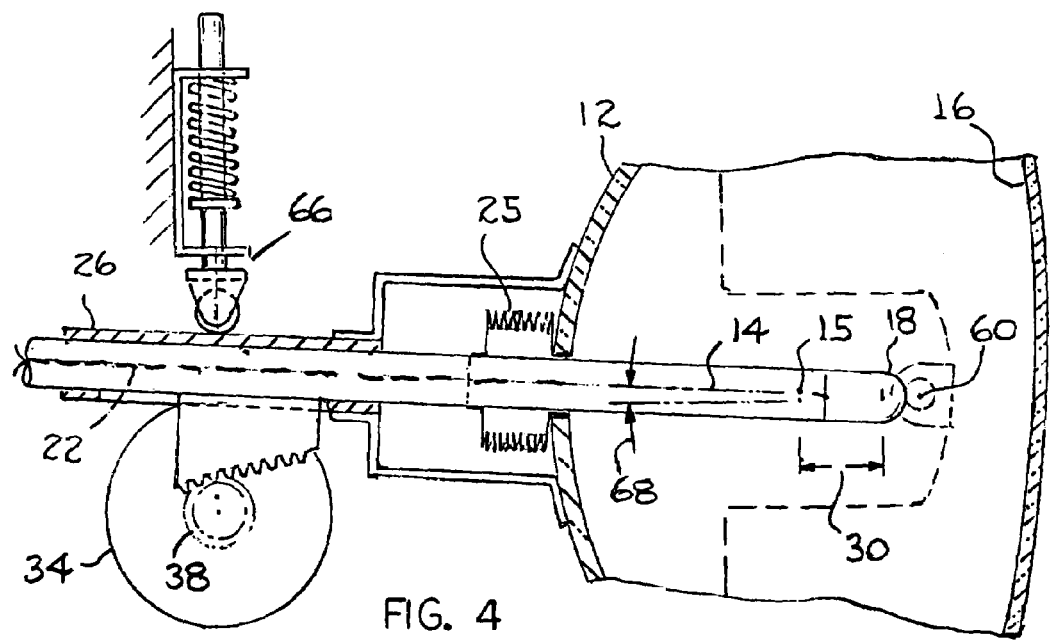
FIG. 4 is a sectional view of the FIG. 4 headlight assembly, with the light source in the low beam position.

In the FIG. 3 arrangement rack 40 is constructed so that the rack teeth are oriented on a pitch line that is acutely angled to the movement axis of tubular conduit 20. The rack teeth orientation causes reflector 12 to have a downwardly-tilted orientation when it is in the low beam operating mode (FIG. 4).

FIG. 3 shows the headlight assembly in the high beam operating mode. A guide roller assembly 66 maintains rack 40 in mesh with pinion gear 38. When servo motor 34 is energized to move tube 20 rightwardly to the FIG. 4 low beam position, the angulation of the rack teeth raises the left end portion of tube 20. The tube swings around pivot axis 60, so that the mirror focal axis 14 is tilted downwardly and forwardly. Numeral 68 references the angular change in the focal axis direction, measured around pivot axis 60. Each pivot pin extends into a pivot hole (or bearing) in housing 10, such that reflector 12 can pivot around transverse axis 60.

In the FIG. 2 arrangement rack 40 is constructed so that the rack teeth are oriented on a pitch line that is acutely angled to the movement axis of tubular conduit 20. The rack teeth orientation causes reflector 12 to have a downward1-tilted orientation when it is in the low beam operating mode (FIG. 4).

FIG. 3 shows the headlight assembly in the high beam operating mode. A guide roller assembly 66 maintains rack 40 in mesh with pinion gear 38. When servo motor 34 is energized to move tube 20 rightwardly to the FIG. 4 low beam position, the angulaltion of the rack teeth raises the left end portion of tube 20. The tube swings around pivot axis 60, so that the mirror focal axis 14 is tilted downwardly and forwardly. Numeral 68 references the angular change in the focal axis direction, measured around pivot axis 60.

In the FIG. 3 arrangement servo motor 34 can be controlled so that light source 18 can have momentary intermediate positions between the extreme positions depicted in FIGS. 3 and 4. This is advantageous in that the viewing distance (or illumination zone) can be optimized for different operating conditions (i.e. country driving and driving in traffic).

The downward tilt of the reflector around axis 60 is advantageous, in that emergent light rays are directed at a slight downward angle to a so-called "normal" low beam position. When the headlight is in high beam operating mode the light beam is directed generally horizontally, as will be apparent from FIG. 3. Pivot axis 60 is located on focal axis 14 so that focal point 15 is between pivot axis and 60 and the parabolic reflective surface, such that angulation 68 is relatively small.

The two arrangements depicted in the drawings (FIG. 1 and FIG. 3) are generally similar, in that light source 18 is mounted on a tubular conduit 20 extending through an opening 24 in reflector 12 located on focal axis 14 of the reflector. Conduit 20 can be moved along axis 14 to adjust light source 18 between a high beam operating mode (on the mirror focal point), and a low beam operating mode (located so that the focal point is between the light source and the mirror surface) through an infinite number of positions. The FIG. 3 arrangement adds a feature wherein the beam central axis 14 is automatically tilted downwardly a few degrees when the headlight assembly is in the "low beam" operating mode.

What is claimed:

1. A vehicle headlight assembly comprising:
    a concave reflector having a focal axis and a focal point on said axis;
    a light source located on said focal axis, said reflector having an opening aligned with said focal axis; said light source having a tubular conduit extending through said opening on the focal axis;
    an electrical power means comprising:
        an electric motor,
        a pinion gear driven by said motor, and,
        a rack having a first side fixedly connected to said conduit, said rack having a plurality of teeth for operable engagement with said pinion gear, said teeth orientated on a line that is acutely angled relative to the axis of said conduit, for movement of the tubular conduit in both horizontal and vertical directions;
    said electrical power means for moving said conduit on its axis through tho plane of said opening, whereby said light source is moved toward or away from the reflector through an infinite number of positions between the high beam and the low beam positions; and,
    a pivot support means for said reflector, whereby the focal axis of the reflector is adjusted from a generally horizontal orientation to a downwardly-tilted orientation in response to the vertical movement of said conduit as the electrical power means displaces the tubular conduit of the light source from the high beam position to the low beam position.

2. The headlight assembly of claim 1, and further comprising an annular seal between the tubular conduit and the opening in the reflector for preventing any migration of dirt or moisture through said opening.

3. The headlight assembly of claim 1, wherein said reflector has a parabolic reflective surface facing the light source.

4. The headlight assembly of claim 3, wherein said pivot support means is located on said focal axis.

5. The headlight assembly of claim 4, wherein said pivot support means is located so that the focal point is between the pivot support means and the parabolic reflective surface.

6. The vehicle headlight assembly of claim 1, and further comprising light source wiring extending within said tubular conduit.

7. The vehicle headlight assembly of claim 1 further comprising a tube guide roller assembly for maintaining the teeth of said rack in mesh with said pinion gear.

8. A vehicle headlight assembly comprising:
   a concave reflector having a focal axis and a focal point on said axis;
   a light source located on said focal axis, said reflector having an opening aligned with said focal axis; said light source having a tubular conduit extending through said opening on the Local axis;
   an electrical power means comprising:
   an electric motor,
   a pinion gear driven by said motor, and,
   a rack having a first side fixedly connected to said conduit, said rack having a plurality of teeth for operable engagement with said pinion gear, said teeth orientated on a line that is acutely angled relative to the axis of said conduit, for movement of the tubular conduit in both horizontal and vertical directions;
   said electrical power means for moving said conduit on its axis through the plane of said opening, whereby said light source is moved toward or away from the reflector through an infinite number of positions between the high beam and the low beam positions;
   a pivot support means for said reflector, whereby the focal axis of the reflector is adjusted from a generally horizontal orientation to a downwardly-tilted orientation in response to the vertical movement of said conduit as the electrical power means displaces the tubular conduit of the light source from the high beam position to the low beam position; and,
   a guide roller assembly for maintaining the teeth of said rack in mesh with said pinion gear.

* * * * *